United States Patent
Chies et al.

(10) Patent No.: US 6,641,339 B2
(45) Date of Patent: Nov. 4, 2003

(54) CLAMP FOR A KEY DUPLICATING MACHINE

(75) Inventors: Ezio Chies, Vittorio Veneto (IT); Eros Foscan, Vittorio Veneto (IT)

(73) Assignee: Silca S.p.A., Vittorio Veneto (IT)

( * ) Notice: Subject to any disclaimer, the term of this patent is extended or adjusted under 35 U.S.C. 154(b) by 57 days.

(21) Appl. No.: 09/944,168

(22) Filed: Sep. 4, 2001

(65) Prior Publication Data

US 2002/0182022 A1 Dec. 5, 2002

(30) Foreign Application Priority Data

Jun. 1, 2001 (IT) .................................. VE2001A0028

(51) Int. Cl.[7] .................................................. B23C 3/35
(52) U.S. Cl. ........................ 409/81; 269/303; 269/315; 409/225
(58) Field of Search ............................. 409/81, 82, 83, 409/225; 269/303, 307, 315

(56) References Cited

U.S. PATENT DOCUMENTS

| | | | | |
|---|---|---|---|---|
| 1,848,046 A | * | 3/1932 | Caron | 409/81 |
| 3,286,597 A | * | 11/1966 | Schwartz | 409/81 |
| 4,188,163 A | * | 2/1980 | Juskevic | 409/82 |
| 4,256,423 A | * | 3/1981 | Juskevic | 409/82 |
| 5,496,138 A | * | 3/1996 | Drori | 409/81 |
| 5,711,643 A | * | 1/1998 | Parr et al. | 409/83 |
| 6,033,164 A | * | 3/2000 | Hoffman et al. | 409/81 |
| 2002/0141843 A1 | * | 10/2002 | Mueller et al. | 409/132 |

FOREIGN PATENT DOCUMENTS

FR   1414033   * 9/1965 .................. 409/83

* cited by examiner

Primary Examiner—Daniel W. Howell
(74) Attorney, Agent, or Firm—Birch, Stewart, Kolasch & Birch, LLP

(57) ABSTRACT

An improved clamp for key duplicating machines, comprising a pair of jaws able to approach each other and define at least one seat for clamping a key, and a gauge associable with said seat to define a correct position of said key, wherein with said gauge there is slidingly associated a counteracting element which interferes with said seat when said gauge is in its operating condition and forms a support for a tip of said key housed in said seat.

7 Claims, 1 Drawing Sheet

CLAMP FOR A KEY DUPLICATING MACHINE

FIELD OF THE INVENTION

The present invention relates to an improved clamp for a key duplicating machine.

DESCRIPTION OF THE PRIOR ART

Known key duplicating machines generally comprise a first clamp in which the blank key to be notched is mounted, and a second clamp in which the original key to be duplicated is mounted.

The blank key and the original key must be positioned correctly in their respective clamps.

This correct positioning of a key in its respective clamp is achieved by the presence (in proximity to the head of the key) of a retainer which is rested against a counteracting element or "gauge" with which the clamp is provided.

For keys not provided with a retainer or in which the retainer is not reliable, the tip of the key is used as the counteracting element for its correct positioning.

For this purpose each clamp is provided (in those positions in which the tip of the key could lie) with a series of slits disposed perpendicular to the seat of the key. A transverse plate, forming a support for the tip of the key, can be removably inserted into each of these slits.

This solution enables the exact positioning of the key to be defined relative to the clamp even if the retainer is not present on the key, but at the same time it results in a series of drawbacks which the present invention proposes to eliminate.

A first drawback consists of the fact that the plate represents a removable element, which requires an actual operation for its removal once the key has been positioned and locked on the clamp. If this element is not removed in time, its presence can damage the duplicating machine during the notching of the key.

Another drawback consists of the fact that if the plate is erroneously left in the slit during the duplication operations, it can accidentally escape from the slit and fall into moving parts of the machine (carriage, cutter, etc.) and damage them.

Another drawback is the difficulty and laboriousness of the operations involved in inserting the plate into the required slit. These operations having to be expressly repeated for each duplication cycle.

BRIEF SUMMARY OF THE INVENTION

All of these drawbacks are eliminated, according to the invention, by an improved clamp for key duplicating machines, comprising a pair of jaws which have the ability to approach each other and define at least one seat for clamping a key, and a gauge associable with said seat to define the correct position of the key, characterized in that with said gauge there is slidingly associated a counteracting element which interferes with said seat when said gauge is in its operating condition and forms a support for the tip of the key housed in said seat.

BRIEF DESCRIPTION OF THE DRAWINGS

A preferred embodiment of the invention is described in detail hereinafter by way of a non-limiting example with reference to the accompanying drawings, in which.

DESCRIPTION OF PREFERRED EMBODIMENTS

Figure 1:
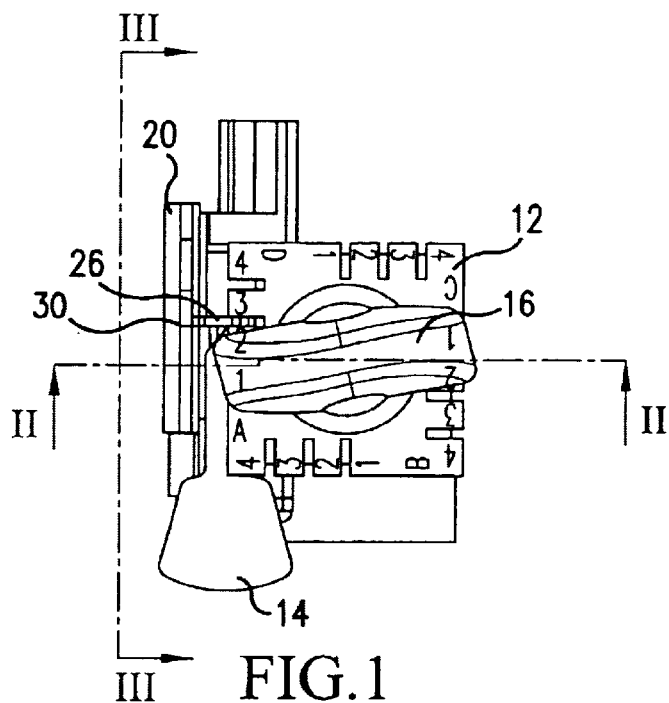
FIG. 1 is a plan view of a clamp according to the invention.
Figure 2:
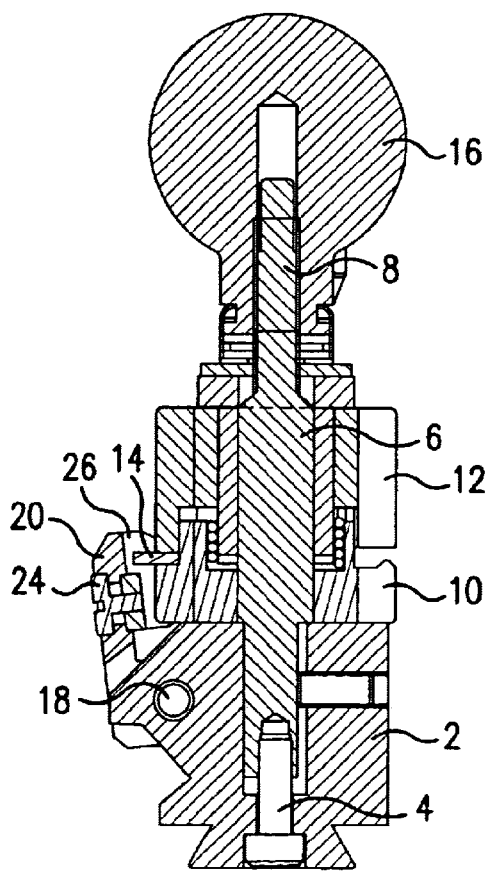
FIG. 2 is a vertical section therethrough on the line II—II of FIG. 1.
Figure 3:
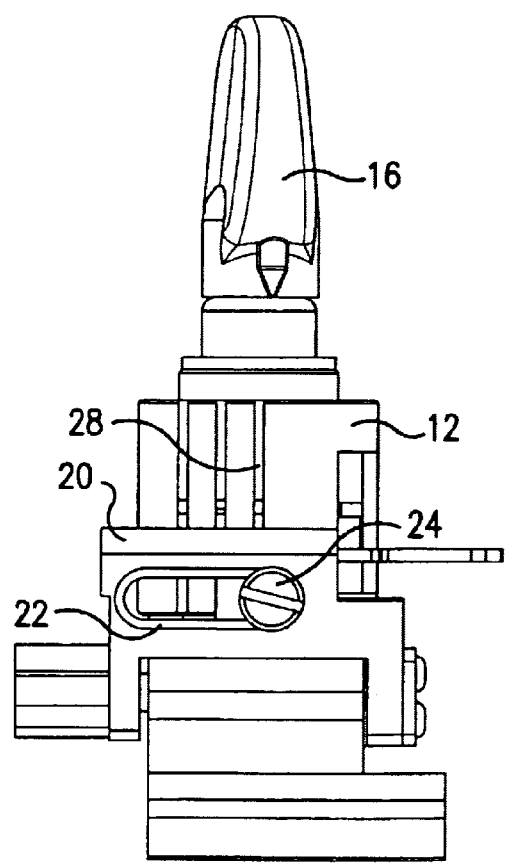
FIG. 3 is a side view thereof in the direction III—III of FIG. 1.

As can be seen from the figures, the clamp of the invention comprises a base 2, by which the clamp can be fixed to the structure (not shown) of the duplicating machine.

A pin 6 comprising an upper threaded portion 8 is fixed to the base 2, preferably by a screw 4.

The purpose of the pin 6 is to retain the two jaws 10 and 12 of the clamp in a perfectly superposed condition. These are square in plan view, with their facing surfaces equally or differently shaped in order to retain between them keys of different formation. More particularly, the sides of the facing surfaces of the two jaws 10 and 12 can be flat or comprise ribs complementary to any grooves present in the key 14 to be retained between the jaws.

Between the lower jaw 10 and the base 2 there can also be provided traditional means (not shown in the drawings) to ensure correct positioning of the two jaws in four different stable positions angularly rotated through 60° from each other, in order to use the four sides of each jaw to increase the number of different key profiles which can be retained by the clamp.

A knob 16 is screwed onto the threaded portion 8 of the pin 6 in order to lock the two jaws 10, 12 and the key 14 if interposed between them, to the base 2 and hence to the duplicating machine structure, by a single operation.

A counteracting element or "gauge" 20 is also hinged to the base 2 on a horizontal pin 18, to perform the traditional reference function for the correct positioning of a pin provided with a retainer, and for correctly aligning with the clamp for non-notched side of said key if the notching is to involve both its sides of the key.

The gauge 20 comprises a horizontal slot 22 along which there can slide the threaded shank of a screw 24 for fixing to the gauge a plate 26 of thickness suitable for its insertion into slits 28 provided in different vertically aligned positions in the four sides of the jaws 10 and 12.

The slits 28 are provided in the jaws 10 and 12 in the most customary positions in which the end of the key 14 to be clamped between the jaws can lie.

To facilitate the correct positioning of the plate 26 along the s slot 22 so that it coincides with the slits 28, one edge of said slot 22 is provided with marks 30 identifying the different correct positions of said plate.

The operation of the clamp of the invention is evident from the aforegoing description:

If the key is provided with a retainer, the key is positioned between the two jaws 10, 12 after the gauge has been brought into its operating position by raising it and rotating it about the pin 18, to thus ensure correct positioning of the key before operating the knob 16 to clamp it between the jaws 10 and 12. Before commencing the duplication operations, the gauge 20 is removed so that it does not interfere with the operations.

During the duplicating, the plate 26 is maintained at the outer end of the slot 22 (to the left with references to FIG.

3), so that it does not interfere with the jaws 10, 12 during the raising of the gauge 20. It can also be removed if the key to be duplicated is particularly long.

If the key is not provided with a retainer, however, and requires its tip to be supported in order to define its correct position in the clamp, the pair of slits 28 at which the tip has to rest must be identified first. The screw 24 is then slid along the slot 22 until the plate 26 corresponds with that pair of slits.

When this has been achieved, the gauge 20 is raised until the plate 26 enters the selected slits, the key 14 is interposed between the jaws 10, 12 with its tip resting against the plate 26, and finally the knob 16 is operated to clamp the key between the two jaws in the correct position for duplication.

From the foregoing it is apparent that the improved clamp of the invention is particularly advantageous, and in particular:

it prevents the plate 26 from being able to escape from the clamp and accidentally fall into moving parts of the machine, there is no risk that the plate remains inadvertently inside the slits during duplication, to damage the duplicating machines, having adjusted the position of the plate 26 along the gauge 20, it enables the plate to be rapidly and easily inserted into the slits 28 of the clamp each time a key is fixed into the clamp, it uses the gauge 20 for a new function, namely that of interacting with the plate 26.

We claim:

1. An improved clamp for key duplicating machines, comprising a pair of jaws able to approach each other and define at least one seat for clamping a key, and a gauge, hinged and rotatable at a first portion and associable with said seat to define a correct position of said key, wherein with said gauge there is slidingly associated at a portion different from the first portion, a counteracting element which interferes with said seat when said gauge is in its operating condition and forms a support for a tip of said key housed in said seat.

2. A clamp as claimed in claim 1, wherein said counteracting element consists of a plate insertable into a slit chosen from a plurality of slits provided in both the jaws of said clamp.

3. A clamp as claimed in claim 1, wherein said counteracting element is removably associated with said gauge.

4. A clamp as claimed in claim 1, wherein said counteracting element is fixed to said gauge by a screw passing through a slot provided in a gauge parallel to said seat of said key within said clamp.

5. A clamp as claimed in claim 4, wherein at least one edge of said slot is provided with marks for identifying the position of said plate along said gauge such that it coincides with said slots.

6. An improved clamp for key duplicating machines, comprising a pair of jaws able to approach each other and define at least one seat for clamping a key, and a gauge associable with said seat to define a correct position of said key, wherein with said gauge there is slidingly associated a counteracting element which interferes with said seat when said gauge is in its operating condition and forms a support for a tip of said key housed in said seat, wherein said counteracting element consists of a plate insertable into a slit chosen from a plurality of slits provided in both the jaws of said clamp.

7. An improved clamp for key duplicating machines, comprising a pair of jaws able to approach each other and define at least one seat for clamping a key, and a gauge associable with said seat to define a correct position of said key, wherein with said gauge there is slidingly associated a counteracting element which interferes with said seat when said gauge is in its operating condition and forms a support for a tip of said key housed in said seat, wherein said counteracting element is fixed to said gauge by a screw passing through a slot provided in a gauge parallel to said seat of said key within said clamp.

* * * * *